C. LE G. FORTESCUE.
DISTRIBUTING SYSTEM.
APPLICATION FILED MAY 14, 1915.
1,308,059.                                  Patented July 1, 1919.
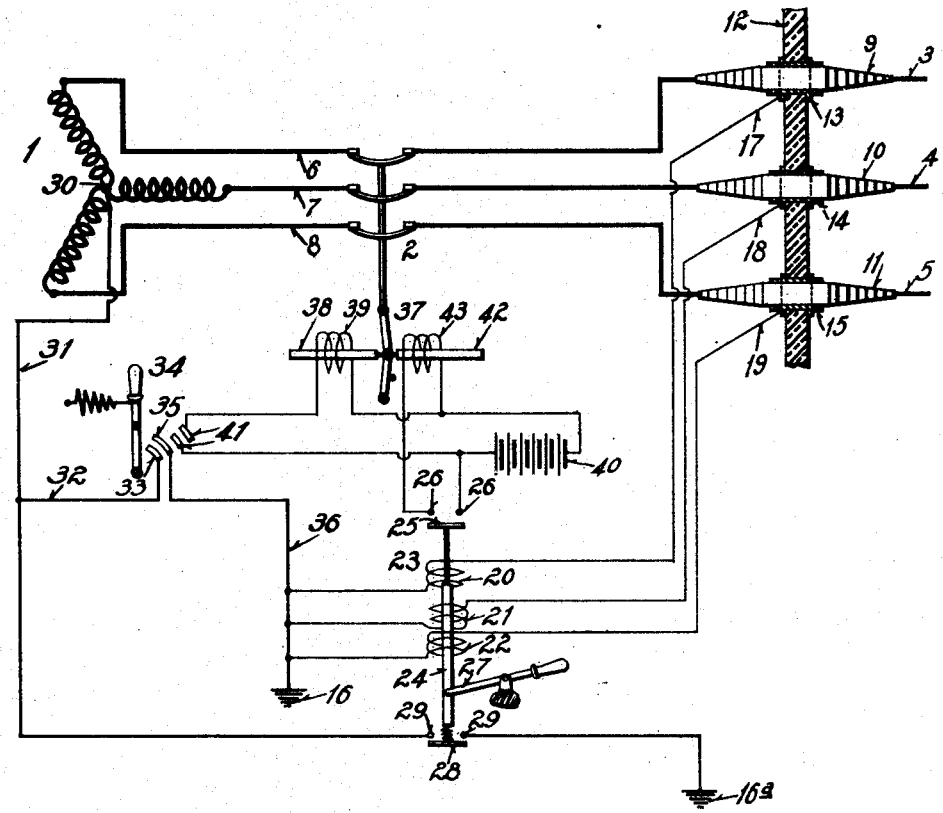
WITNESSES:                                       INVENTOR
                                          Charles LeG. Fortescue.
                                                    BY
                                                         ATTORNEY

UNITED STATES PATENT OFFICE.

CHARLES LE G. FORTESCUE, OF PITTSBURGH, PENNSYLVANIA, ASSIGNOR TO WESTINGHOUSE ELECTRIC AND MANUFACTURING COMPANY, A CORPORATION OF PENNSYLVANIA.

DISTRIBUTING SYSTEM.

1,308,059.      Specification of Letters Patent.      Patented July 1, 1919.

Application filed May 14, 1915. Serial No. 28,125.

*To all whom it may concern:*

Be it known that I, CHARLES LE G. FORTESCUE, a subject of the King of Great Britain, and a resident of Pittsburgh, in the county of Allegheny and State of Pennsylvania, have invented a new and useful Improvement in Distributing Systems, of which the following is a specification.

My invention relates to electrical distributing systems, and it has special reference to protective means for systems that are exposed to transient disturbances arising from arcing grounds, switching operations, unbalanced load conditions, atmospheric disturbances, etc.

More particularly, my invention refers to an electrical distributing system which is normally ungrounded but which has a neutral point that may be grounded when disturbances occurring upon the system are liable to injure the apparatus connected in circuit therewith.

When a Y-connected transformer having its neutral point grounded supplies power to a transmission system, the potential between any transmission conductor and ground is maintained at a relatively low value under all operating conditions, because a neutral point of the system is firmly held at ground potential which limits the extent to which the potentials of the transmission conductors may be raised. If a transmission conductor of such a system is partly or completely grounded, the system may be so unbalanced as to be substantially inoperative. Again, grounded systems may be highly undesirable when intelligence transmission circuits, such as telephone or telegraph circuits, are disposed in proximity thereto. Since the neutral point is connected to ground, leakage currents arising from defective insulation of the line conductors may flow through ground, thereby continuously inducing disturbances upon the adjacent telephone or telegraph system. If one of the line conductors becomes partly or completely grounded, the disturbances impressed upon the adjacent telephone circuit may seriously interfere with the successful transmission of intelligence.

However, grounded systems are desirable in order to limit the extent of transient disturbances that may be imposed thereupon. For instance, when switching operations are performed upon a grounded system, the surges and high frequency oscillations arising therefrom will be limited in extent, inasmuch as the neutral point of the system is firmly held at ground potential which, in turn, limits the value to which the potentials on the transmission conductors may rise. In view of these considerations, it is desirable to employ transmission systems which have a grounded neutral point, but, because of serious disturbances impressed upon adjacent telephone systems, grounded systems cannot, in all cases, be utilized.

In ungrounded systems, the neutral point is normally insulated from ground. When the various phases comprising the system are unequally loaded, the potential of the neutral point may vibrate within a certain fixed range of potentials which, in turn, establishes unequal potentials between the neutral point and the conductors of the transmission system. Again, if a high voltage ungrounded transmission system is employed, the high potential windings of the transformers supplying power thereto may create high frequency oscillations in the system because of the resonant effects resulting from the reactance of the transformer windings and the electrostatic capacity of the transmission line conductors. When switching operations are performed upon such a system, surges and high frequency oscillations result which may seriously strain the insulation of the connected apparatus in circuit, and particularly the insulation of the windings of the transformers. Inasmuch as the neutral point is free to vibrate, the potential of the neutral point may be raised to a substantially high value, and the consequent potentials of the transmission line conductors may also assume correspondingly high values because the system is permitted to oscillate at its own frequency. However, ungrounded transmission systems preclude the flow of ground currents and, therefore, do not impress disturbances upon adjacent telephone or telegraph circuits. As a result, it is highly desirable to usually operate transmission systems as ungrounded systems.

In view of the operating advantages arising from the use of ungrounded transmission systems, it is desirable to provide means therein for limiting the stresses that may be imposed upon the associated apparatus when switching operations upon the system are performed, or when any transient disturbances tending to develop extremely high potentials are impressed upon the system. Moreover, it is also desirable to limit the disturbances which may be confined to one or more of the transmission line conductors and which may be dangerous to the connected apparatus unless suppressed.

To overcome the above-mentioned difficulties, I have invented a protective system whereby the neutral point of a normally ungrounded transmission system may be grounded when the transmission system is subjected to disturbances that may develop abnormally high stresses thereupon. It will be understood that my protective system operates to ground the neutral point of the transmission system when disturbances, such as those arising from switching operations, atmospheric disturbances, arcing grounds, etc., are impressed thereupon.

In order to understand my invention more fully, reference may be had to the following description and the accompanying drawing in which the single figure is a diagrammatic view of a transmission system embodying a form of my invention.

Referring to the drawing, it will be noted that I have shown a three-phase transmission system but, to those skilled in the art, it will be apparent that my invention may be applied with equal effectiveness on any transmission system which permits the grounding of a neutral point. A source of a three-phase power supply, shown at 1 as being a Y-connected high-tension winding of a transformer, is connected through an electrically-operated three-phase circuit breaker 2 to transmission line conductors 3, 4 and 5. Leads 6, 7 and 8, connecting the terminals of the high-tension winding 1 to the transmission line conductors 3, 4 and 5, respectively, extend through outlet bushings 9, 10 and 11 which project through a wall 12 of the power house. The outlet bushings 9, 10 and 11 are of the well-known condenser type of construction, and each comprises alternate layers of insulating and conducting materials which are wound upon a central conducting member through which the said leads extend. The ends of the outlet bushings 9, 10 and 11 are stepped as shown in the drawing, and their central portions are embraced by metallic members 13, 14 and 15, respectively. In this manner, I provide condensers, corresponding terminals 13, 14 and 15 of which are connected to ground 16 by means of conductors 17, 18 and 19, respectively. Coils 20, 21 and 22 of an electromagnetically-actuated switch 23 are connected respectively in circuit with the aforementioned grounded conductors 17, 18 and 19. The switch 23 comprises a single core member 24, which is in inductive relationship with the aforementioned actuating coils 20, 21 and 22. The upper portion of the core member 24 is provided with an upper bridging member 25 adapted to bridge contact terminals 26 under certain predetermined conditions, as will be hereinafter explained, and the lower portion of the core member 24 is connected to a hand-operating device 27, and is provided with a lower bridging member 28 which is adapted to bridge contact terminals 29.

A neutral point 30 of the high-tension Y-connected winding 1 is connected through a conductor 31 and a conductor 32 to a conducting sector 33 of a master switch 34. Another conducting sector 35 of said master switch is connected through a conductor 36 to ground 16.

The circuit breaker 2 which, in this instance, is shown as a three-phase circuit breaker, comprises a toggle mechanism 37 which may be operated to close the circuit breaker 2 when a plunger 38 of an electromagnetically-operating coil 39 is actuated. The coil 39 is connected in circuit with a source of electric current supply, such as a battery at 40, through contact sectors 41 of the master switch 34. The circuit breaker 2 may be opened when a plunger 42 of an electromagnetically-actuating coil 43 is operated. The coil 43 is connected in circuit with the battery 40 when the upper bridging member 25 of the switch 23 engages the terminals 26.

Inasmuch as it is undesirable to maintain the neutral point 30 of the system grounded at all times, I have provided means for grounding said neutral point when switching operations are being performed, as, for instance, when the transformer winding 1 is being connected to the transmission line comprising the conductors 3, 4 and 5. This is effected through the medium of the master switch 34. When the master switch 34 engages the sectors 33 and 35 only, the neutral point 30 is directly connected to ground 16. On further advancing the switch member, the additional sectors 41 are bridged and a circuit is closed through the coil 39 which, in turn, actuates the plunger 38. As the plunger 38 is advanced into said actuating coil, the toggle mechanism 37 of the circuit breaker 2 is operated to connect the circuit breaker in operative position. When the switch member 34 is released, it occupies the position shown in the drawing, and the ground 16 is disconnected from the neutral point 30 of the system. Since the neutral point 30 is grounded during the switching operation, the disturbances arising therefrom are limited to safe values. In this manner, I obtain the advantages of performing my switching operations with a grounded system and of normally operating my system as an ungrounded system.

When any disturbances occur upon the transmission lines 3, 4 and 5 that may appreciably unbalance the system, the charging currents of the condensers 9, 10 and 11 will vary. Under normal operating conditions, the charging currents of these condensers are equal in value, and the resultant flux actuating the plunger 24 of the switch 23 will be zero because of the method of disposing the coil windings 20, 21 and 22, thereupon. If a disturbance occurs on any one of the line conductors which will temporarily affect its potential, the resultant flux arising from the unequal current flow through the coils 20, 21 and 22 will actuate the plunger 24, if the disturbance is of serious enough consequence. When the plunger 24 is actuated, the bridging member 28 engages the contact members 29 and connects the neutral point 30 of the system to ground 16ª. If the disturbance persists for any length of time or is particularly violent, thus endangering the system, the plunger 24 is further advanced and the bridging member 25 thereof engages the contact terminals 26 which, in turn, close the circuit through the coil 43. The plunger 42, being actuated by the current flow through the coil 43, will operate to open the circuit breaker 2.

When it is desired to open the circuit breaker 2, the neutral point 30 may be first grounded through the bridging member 28 by manually operating the switch member 27. The plunger 24 is then advanced farther to effect engagement between the bridging member 25 and the contact terminals 26.

To those skilled in the art, it will be apparent that the neutral point 30 may be provided at places on the distributing system other than the transformer winding 1.

While I have shown and described one embodiment of my invention, it will be understood that various modifications may be made without departing from the spirit and scope of the appended claims.

I claim as my invention:

1. An alternating current distributing system comprising a neutral point which is normally ungrounded, a circuit-interrupter inserted between the source of power supply and the transmission line conductors, and means for grounding said neutral point prior to closing said circuit-interrupter and for removing the ground therefrom after the aforementioned closure of the circuit-interrupter has been completed.

2. An alternating-current distributing system comprising a winding having a neutral point which is normally disconnected from ground, means for connecting said winding to, and for disconnecting said winding from, the remainder of said system, and means for grounding said neutral point prior to connecting to, and disconnecting said winding from, the distributing system.

3. An alternating current distributing system comprising a source of power supply, transmission line conductors, a circuit-interrupter inserted between said source of power supply and the transmission conductors, a neutral point which is normally ungrounded, and automatic means for grounding said neutral point prior to closing said circuit-interrupter.

4. An alternating current system comprising a source of power supply, transmission line conductors, a circuit-interrupter inserted between said source of power supply and the transmission conductors, a neutral point which is normally ungrounded, and automatic means for grounding said neutral point prior to closing said circuit-interrupter and for removing the ground therefrom after said circuit-interrupter has been closed.

5. An alternating current distributing system comprising a source of electromotive forces which has a neutral point normally ungrounded, transmission conductors, a circuit-interrupter for connecting said transmission conductors to said source, and means for grounding said neutral point prior to closing said circuit-interrupter and for removing the ground therefrom after normal electrical conditions have been restored on the transmission conductors.

6. In an alternating current distributing system comprising a source of electromotive forces, transmission conductors, and a neutral point which is normally ungrounded, of a circuit interrupter for connecting said source of electromotive forces to said transmission conductors, said circuit interrupter comprising means for automatically grounding said neutral point prior to the closure of said circuit-interrupter and for removing the ground from the neutral point after the closure thereof has been effected.

7. A polyphase distributing system comprising a source of electromotive forces, transmission line conductors, a neutral point that is normally ungrounded, a circuit-interrupter inserted between said source of electromotive forces and the transmission line conductors, and means for connecting said neutral point to ground when the potentials of the transmission line conductors become unbalanced to a predetermined degree, and for disconnecting said circuit-interrupter when the unbalancing of the transmission line-potentials exceed said predetermined degree.

8. An alternating current distributing system comprising a source of power supply, transmission line conductors, a circuit-interrupter inserted between said source of power supply and the transmission conductors, a neutral point which is normally ungrounded, and automatic means for grounding said neutral point prior to closing said circuit-interrupter and for removing the ground therefrom after said circuit-interrupter has been closed, and additional means for connecting said neutral point to ground when the potentials of the said transmission line conductors become unbalanced.

9. An alternating current system comprising a source of power supply, transmission line conductors, a circuit-interrupter inserted between said source of power supply and the transmission conductors, a neutral point which is normally ungrounded, and automatic means for grounding said neutral point prior to closing said circuit-interrupter and for removing the ground therefrom after said circuit-interrupter has been closed, and for disconnecting said circuit-interrupter when the unbalancing of the transmission line potentials exceeds a predetermined amount.

10. The method of operating a polyphase transmission system which comprises grounding a neutral point thereof during switching operations and operating normally with an ungrounded neutral.

In testimony whereof, I have hereunto subscribed my name this 29th day of April 1915.

CHARLES LE G. FORTESCUE.

Copies of this patent may be obtained for five cents each, by addressing the "Commissioner of Patents, Washington, D. C."